FIG. I

July 8, 1969 R. L. HAUMESSER ET AL 3,454,743
OVEN TEMPERATURE CONTROL SYSTEM
Filed April 11, 1966 Sheet 2 of 3

INNER OVEN CONTROL

OUTER OVEN CONTROL

INVENTORS
JOHN A. MEYER
ROBERT L. HAUMESSER
BY
Stanley M. Schurgin
ATTORNEY

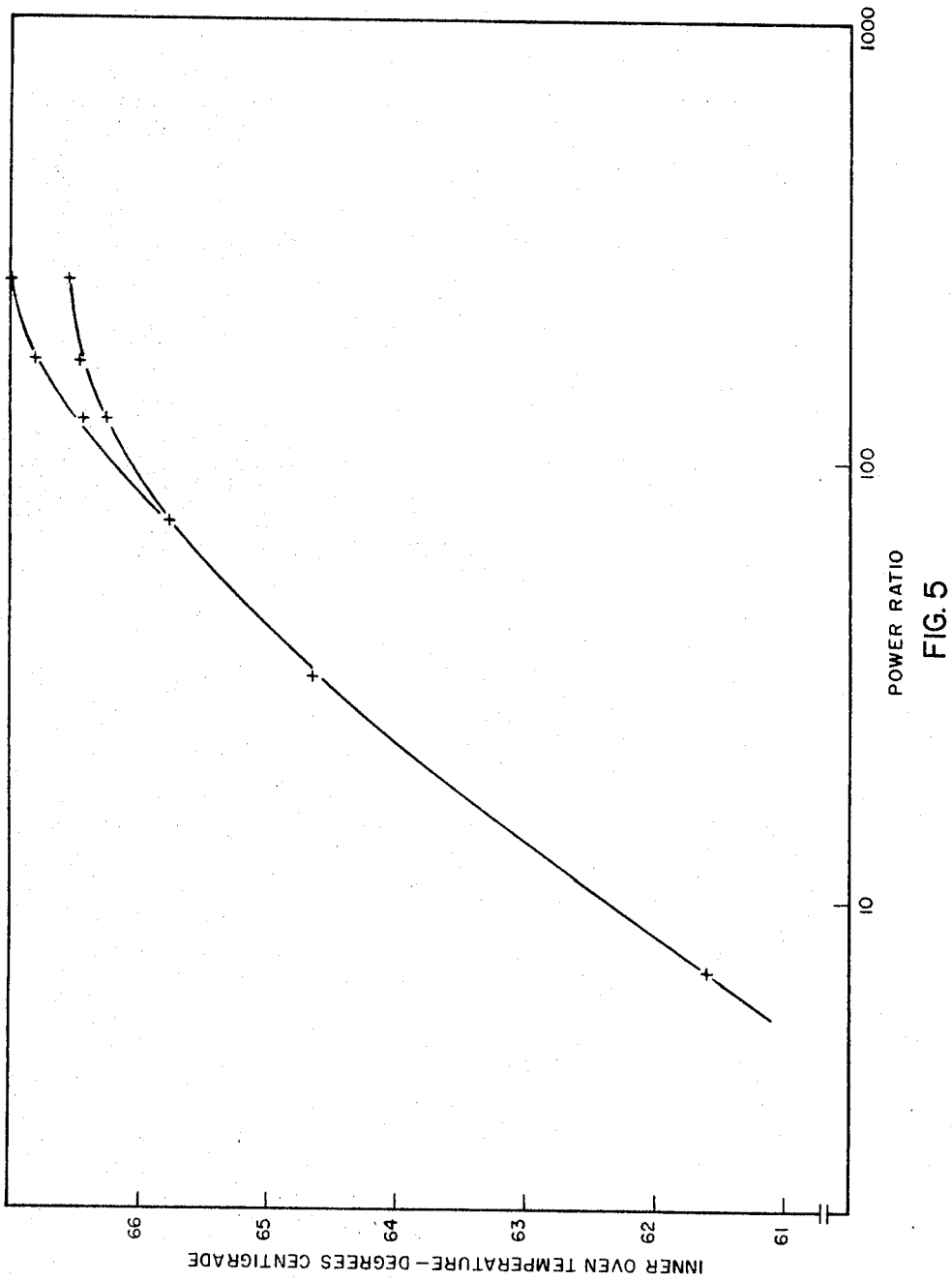

United States Patent Office 3,454,743
Patented July 8, 1969

3,454,743
OVEN TEMPERATURE CONTROL SYSTEM
Robert L. Haumesser, Cheektowaga, and John A. Meyer, Tonawanda, N.Y., assignors to Sylvania Electric Products Inc., a corporation of Delaware
Filed Apr. 11, 1966, Ser. No. 541,734
Int. Cl. G05d *23/12;* F27d *19/00, 11/02*
U.S. Cl. 219—412                                    2 Claims

ABSTRACT OF THE DISCLOSURE

A temperature control system for a thermostatically controlled oven in which the external ambient temperature of the oven is controlled and a variable power anticipator heating element is mounted in close thermal proximity to the oven thermostat to enable variation of the oven-to-thermostat power ratio and, thus, adjustment of the oven temperature setting.

---

This invention relates to temperature control of a precision oven, and more particularly to a fixed thermostatic control system for an oven with the capability of temperature adjustment over a limited range.

Many components of modern electronic circuitry require precise control of temperature for proper operation. Typical of these components are the crystals of crystal controlled oscillators. The frequency of the crystals is highly temperature sensitive, so that a temperature controlled housing is required for stable oscillator operation. This environment is normally provided by means of a crystal oven. Additionally, a crystal typically has an optimum operating temperature, generally called the turn temperature, at which it is minimally sensitive to variations in temperature. Because of manufacturing variations, turn temperatures of crystals differ; thus, oven temperatures must be adjustable over a range of several degrees so that the oven temperature may be present to match the turn temperature of a given crystal.

Precision oscillators generally employ two concentric ovens to provide the closely regulated temperature environment required. The outer oven provides a rough degree of stabilization in a varying ambient temperature (of the order of 1° C. oven variation), while the inner oven, which houses the crystal itself, maintains temperature variations to within a few millidegrees.

Basically, three practical methods of controlling oven temperature are available—fixed thermostatic control, adjustable thermostatic control, or proportional control. Thermostatic control is essentially digital, or on-off type control. A sensing element, together with associated circuitry, acts as a switch to energize the heating elements when the temperature is below a given setting, and to turn off the heating element when the temperature exceeds the given setting. Proportional control is essentially analog. A sensor provides a voltage signal corresponding to the desired temperature setting. An error signal proportional to the difference between the desired temperature and the actual temperature is produced, and this signal is employed to corrspondingly control the amount of heat generated by the heating element.

Thermostatic ovens and proportional ovens each have their own particular advantages. The external circuitry of a fixed thermostatically controlled oven is much simpler than that of a proportional oven, so that fixed thermostatic ovens are less expensive. Also, because of the more complex circuitry involved, and because of the tendency of proportional oven sensors to drift, proportional ovens are generally less reliable than fixed thermostatic ovens. For these reasons of economy and reliability, fixed thermostatic ovens are usually preferred, and are generally used, with the outer ovens of dual oven systems.

Proportional control is generally used with the inner ovens of dual oven systems, mainly because it provides a simple means of adjusting the inner oven operating temperature merely by changing a reference voltage. Fixed thermostatic ovens have a fixed operating point, and heretofore have not been adjustable.

Adjustable set point temperature thermostats are available; however, the bimetallic types generally employed to control temperature in a home do not possess the necessary characteristics of accuracy, repeatability, and low dwell for precision oven applications. Adjustable set point mercury-in-glass thermostats sacrifice size, economy, and reliabilty to attain the adjustable feature.

Accordingly, it is a principal object of the present invention to provide an improved adjustable temperature control system for precision ovens.

A more specific object of this invention is to provide a precision oven temperature control system which combines the economy and reliability of fixed thermostatic control systems with the convenient adjustability of proportional control systems.

Briefly, the foregoing objects are achieved by (a) controlling the external ambient temperature of the oven, (b) employing a fixed operating point thermostat for control of the oven heating element, and (c) using a variable power anticipator heating element in close thermal proximity to the thermostat to enable variation of the oven-to-thermostat power ratio (the amount of heat used in raising the temperature of the oven divided by the amount of heat used in raising the temperature of the thermostat) and, adjustment of the temperature setting of the oven. In practice, a dual oven system may be employed, with the adjustable temperature setting feature being applied to the inner oven, and the enclosing outer oven being thermostatically controlled to maintain the amibent temperature external of the inner oven within a given range. In a preferred embodiment, the anticipator and a variable resistor are serially connected across the inner oven heating element, the variable resistor enabling variation of the electrical current flowing through the anticipator to thereby vary the proportion of heat dissipated by the anticipator with respect to the heat dissipated by the inner oven heating element. In this manner the oven-to-thermostat power ratio is varied, permitting adjustment of the set temperature level of the inner oven.

Other objects, features and advantages of the invention, and a better understanding of its construction and operation will be apparent from the following detailed description taken in conjunction with the accompanying drawings, in which:

FIG. 5 is a graph of test results illustrating the shift of inner oven temperature with variation of oven-to-thermostat power ratio.

In the following discussion, the term "thermostat" refers to a mercury-in-glass type, wherein expansion of a mercury column within a glass tube completes an electrical circuit, at a given mercury temperature, by means of contact with a platinum wire embedded in the glass tube. This type of thermostat is preferred for precision oven applications because of its high degree of accuracy and repeatability, its very low dwell period, and its relative resistance to long term drift; however, the method described is applicable to any type of fixed thermostat meeting the ancillary design requirements.

The thermal energy generated by the heating element of a thermostatically controlled oven performs two functions: (a) it is dissipated by conduction, convection and radiation to the ambient environment, thereby maintaining the temperature gradient between the oven and the ambient environment; and, (b) any heat generated in excess of that required by (a) raises the temperature of the oven and its associated structure. Of the heat which acts to raise the temperature, a portion is used to raise the temperature of the oven proper, and a portion is used to raise the temperature of the thermostat. There exists, therefore, a power ratio (P.R.) which shall be defined as follows:

$$P.R. = Q_o/Q_t$$

where:

$Q_o$ = the amount of heat used in raising the temperature of the oven.

$Q_t$ = The amount of heat used in raising the temperature of the thermostat.

The P.R. can be varied in several ways, two of which will be briefly described. First, the thermostat may be physically moved toward or away from the heating element by a suitable mechanical system. This action will increase or decrease, respectively, the thermostat's share of the generated heat. A second method of varying the P.R. is to place a separate heating element, called an anticipator, in contact with, or in close thermal proximity to, the thermostat. Varying the electrical current flowing through the anticipator will, for a constant dissipation in the main oven heater, cause variations in $Q_t$ and thus variations in P.R.

Figure 1:
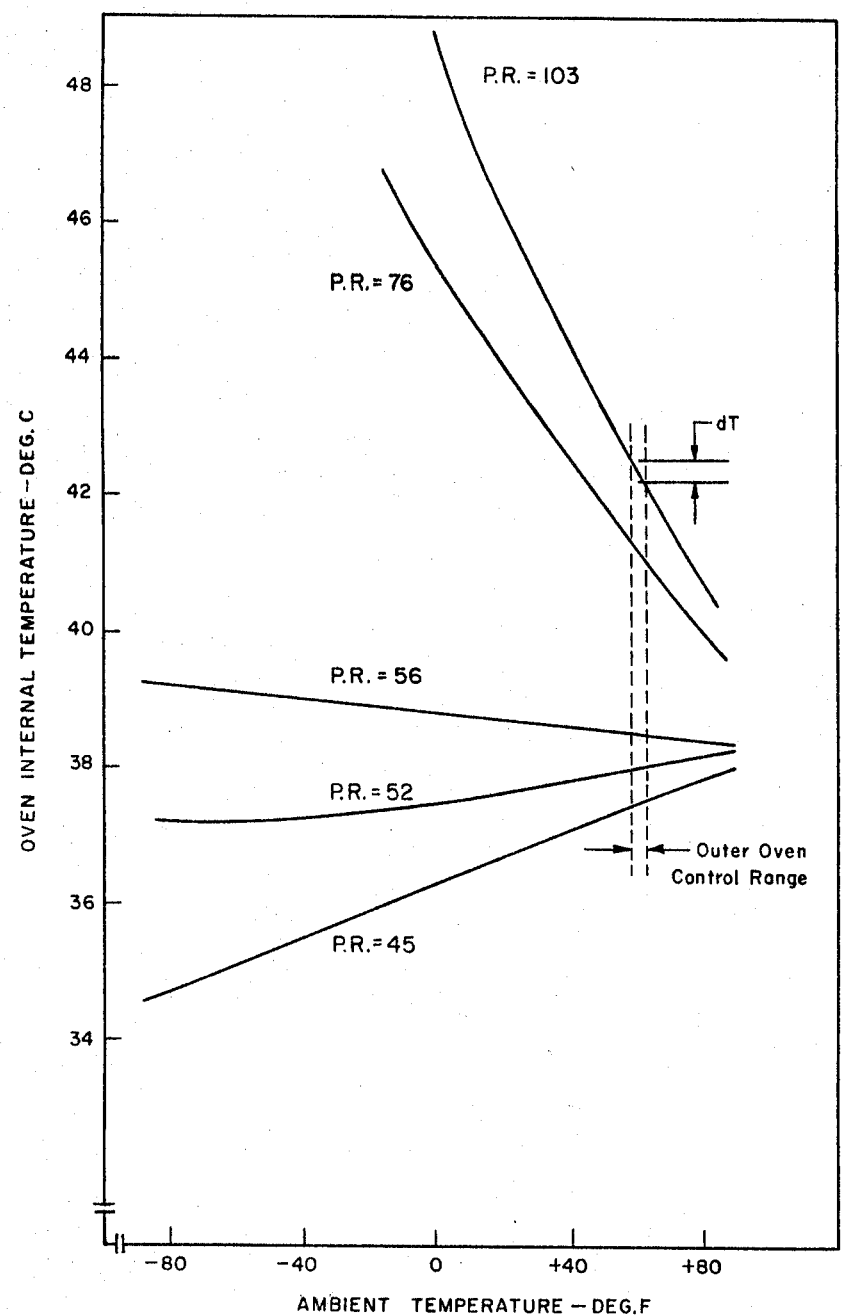
FIG. 1 is a graph showing the relationship of oven internal temperature vs. ambient temperature for various oven-to-thermostat power ratios (P.R.)

The effect of variations in the P.R. is to change the slope of the curve relating internal oven temperature to oven ambient temperature, as illustrated in FIG. 1. In this graph, distance along the horizontal axis represents increasing ambient temperature, while distance along the vertical axis represents increasing internal oven temperature. For the moment, assume the discussion to be limited to the performance of a single thermostatically controlled oven. Then, as indicated by the curves labelled P.R., the internal oven temperature, as the ambient temperature varies, can be made to increase, decrease, or remain relatively constant by varying P.R. The P.R. curves shown in FIG. 1 represent measured data on a small oven. In actuality, these curves may be linear or non-linear, and the degree of linearity and slope dependence upon P.R. are related to specific oven designs. Hence, a common design problem with a single oven or the outer oven of a dual oven system is to find that P.R. which will result in relatively "flat" response curve. For example, in the case illustrated by FIG. 1, the desired P.R. is about 54. The term power ratio and the analysis resulting in FIG. 1 have not been employed in the prior art, however, it has been the practice to achieve a "flat" response in oven control by proper placement of the thermostat or use of a fixed anticipator.

Now consider a dual oven system, with the vertical axis of the FIG. 1 graph representing the internal temperature of the inner oven and the horizontal axis representing the external ambient temperature of the inner oven as controlled by an enclosing outer oven. Assume that the external ambient temperature of the inner oven is held within a small range (e.g. 60±2° F.) by means of the outer oven, as indicated by the area labelled "outer oven control range." Inspection of FIG. 1 will indicate that variations in the P.R. of the inner oven now result in changes in the nominal operating temperature of the inner oven, as indicated by the intersection of the various curves with the nominal 60° F. ambient line (outer oven control temperature). At any one of these P.R. settings, there will exist a small fluctuation of the inner oven temperature about the nominal operating temperature, dependent on the P.R. curve slope and the outer oven control range. For clarity, only the fluctuations corresponding to the P.R.=103 curve are shown, and are labelled $dT$. An additional fluctuation due to thermostatic cyclic action may be expected. However, with proper oven thermal design, the total of these fluctuations may be held to a value comparable to or less than the variation which might be expected from a similarly sized proportional oven.

The present invention lies in the recognition of the above phenomenon and use of the variation in P.R. of an oven located in a temperature controlled environment to adjust the set temperature level in that oven. More specifically, a feature of the present invention is the use of a fixed operating point thermostat with a variable power anticipator to provide temperature control for the inner oven of a dual oven system whereby the temperature setting for the inner oven may be conveniently adjusted by varying the oven-to-thermostat power ratio.

Figure 2:
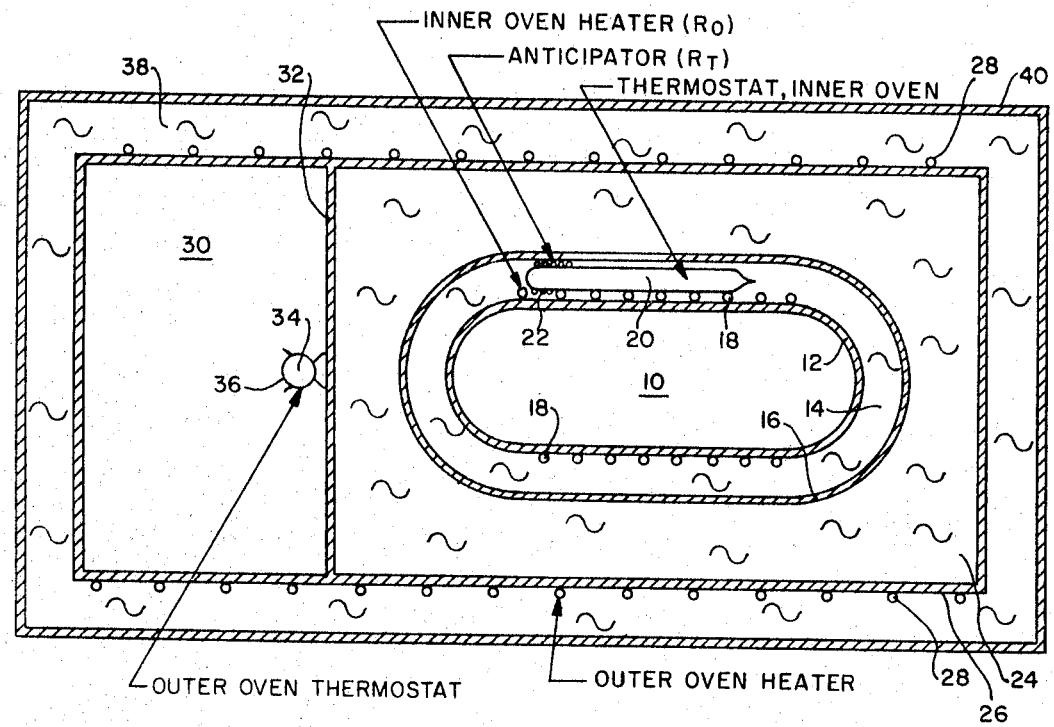
FIG. 2 is a schematic cross-sectional view of a dual thermostatically controlled precision oven system according to the present invention.
Figure 4:
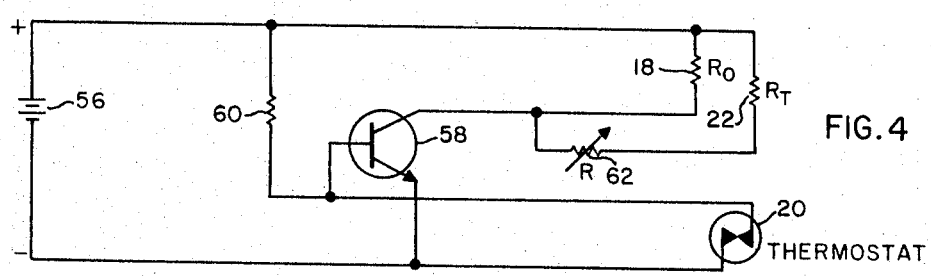
FIG. 4 is a schematic diagram of the electrical control circuit for the inner oven of the dual oven system of FIG. 2.
Figure 3:
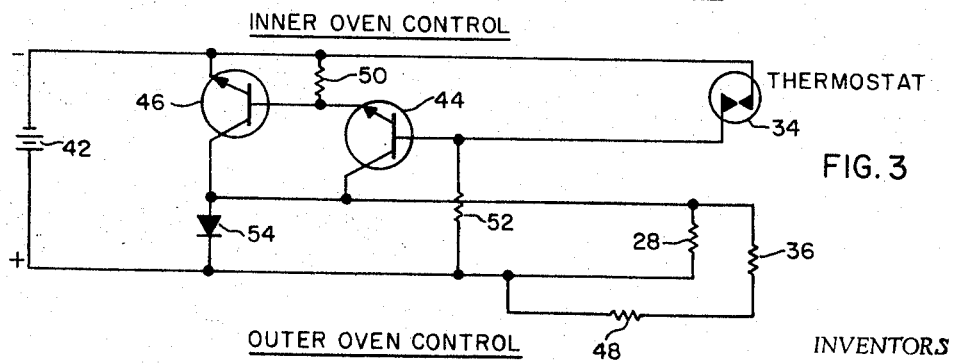
FIG. 3 is a schematic diagram of the electrical control circuit for the outer oven of the dual oven system of FIG. 2.

FIGS. 2, 3 and 4 show an illustrative example of a dual precision oven system and method of control embodying the invention. Referring first to the cross-sectional diagram of FIG. 2, an inner oven chamber 10 is surrounded by a metal shell 12 of good thermal conductivity. A first layer of insulation 14 surrounds the shell 12 and is in turn surrounded by a second similar metal shell 16, which functions as an isotherm control boundary for the inner oven. The inner oven heating element 18 comprises resistance wire wound around the metal shell 12.

In order to control the operating temperature within oven chamber 10, a fixed operating point thermostat 20, preferably of the precision mercury regulator type, and an anticipator heating element 22 are employed. Thermostat 20 is disposed between metal shells 12 and 16, and the anticipator 22 comprises a fine resistance wire wound around the mercury bulb of thermostat 20. The temperature measured by the inner oven thermostat, therefore, results from the heat dissipation of both the inner oven heater 18 and the anticipator winding. Precision thermostats of this type, each having a fixed temperature setting and a temperature differential in its on-to-off and off-to-on operating point of less than 0.01° C., are commercially available.

Surrounding contol shell 16 is a second layer of insulation 24, which is in turn surrounded by the outer enclosure comprising a heat conductive metal shell 26. The outer oven heating element 28 is resistance wire wound around the outer oven shell 26. In the illustrative example of FIG. 2, the outer oven chamber also includes a compartment 30 for locating electrical circuit components, this compartment being partitioned from insulation layer 24 by a heat conductive metal separator wall 32. The outer oven thermostat 34 is mounted in compartment 30 midway on separator wall 32 and has an anticipator 36 wound around its mercury bulb. To complete the oven system, a third layer of insulation 38 is wrapped around metal shell 26, and a metal outside shell 40 encloses the entire package. This particular dual oven system is intended for stabilizing the operation of a crystal oscillator; the crystal is housed in the inner oven chamber 10, which provides very precise temperature control, and the balance of the oscillator circuitry is housed in compartment 30, since a more relaxed temperature control is sufficient for the remaining circuit components.

As shown in the electrical schematic of FIG. 3, the outer oven heater is energized from a direct current (DC) constant voltage source 42, with the "on" and "off" periods of the heater being controlled by a dual transistor switch 44, 46 responsive to the action of thermostat 34. The anticipator winding 36 and a resistor 48 are serially connected across heater 28 for the purposes of stabilizing control. Resistor 48 is selected to fix the parallel current through anticipator 36 at a level which provides an outer oven P.R. yielding a relatively constant outer oven temperature for widely varying outside ambient temperatures.

One terminal of heater 28 is connected to the positive terminal of DC source 42, while the other terminal of the heater is connected to the collector electrodes of switching transistors 44 and 46. The emitter of transistor 44 is connected to the base of transistor 46 and through a resistor 50 to the negative terminal of the DC source. The emitter of transistor 46 is connected to the negative terminal of DC source 42, and a bias resistor 52 is connected between the base of transistor 44 and the positive terminal of source 42. Thermostat 34 is connected between the negative terminal of source 42 and the base of transistor 44 to provide temperature responsive digital control of the transistor switch, and a diode 54 is connected across the parallel heater windings 28 and 36 to clip out transients that may occur due to the inductive characteristics of the heater windings.

In operation, when the outer oven temperature is at a lower level than the set temperature established by the fixed operating point thermostat and the fixed anticipator, the thermostat circuit is open, and the positive voltage applied to the base of transistor 44 via resistor 52 causes transistor 44 to be fully conducting. The conducting transistor 44 provides a voltage level at the base of transistor 46 sufficient to turn it on to saturation, thereby connecting the heater windings directly across the DC energy source 42. When the heat dissipated by heaters 28 and 36 causes the rising mercury column to close the thermostat circuit, the negative terminal of source 42 is connected directly to the base of transistor 44, thereby reverse biasing the transistor to cut-off. The resulting reduction in voltage at the emitter of transistor 44 and base of transistor 46 causes transistor 46 to be reverse biased to cut-off, thereby switching off the heater energy source. When the outer oven temperature again falls below the set temperature, the on-off cycle repeats. In this manner, the outer oven temperature, and hence the external ambient temperature of the inner oven, is maintained within a given range.

The inner oven control circuit shown in FIG. 4 also provides fixed thermostatic control, but with the unique additional feature of a convenient temperature adjustment capability over a limited range. The power requirements of the inner oven circuit are significantly reduced due to the controlled ambient established by the outer oven; consequently, only a single switching transistor is required for controlling energization of the inner oven heater 18. One terminal of heater 18 is connected to the positive terminal of a DC source 56 (which preferably is derived from the same power supply as source 42), and the other heater terminal is connected to the collector of a transistor 58. The base of transistor 58 is connected to one terminal of thermostat 20 and through a bias resistor 60 to the positive terminal of source 56. The other terminal of the thermostat and the emitter of transistor 58 are connected to the negative terminal of the DC source 56.

In parallel with the inner oven heater 18 is connected a variable power anticipator circuit comprising anticipator winding 22 and a variable resistor 62 connected in series. Variable resistor 62 provides the means for controlling the parallel path current flow through anticipator 22 to thereby vary the proportion of heat dissipated by the anticipator with respect to that dissipated by heater 18. Thus, for a constant value of inner oven heater resistance, $R_o$, (which is the case in view of the constant voltage source 56) the power ratio, P.R., can be conveniently varied, and, since the external ambient established by the outer oven is relatively constant, the set temperature level of the inner oven may be conveniently adjusted, as illustrated by FIG. 1. That is, the variable power anticipator enables the inner oven to be set at a number of different temperatures other than the mercury regulator set temperature.

For circuit design purposes, it is clear from the above discussion that, by use of Ohm's law and the power relationships, the power ratio may also be expressed as, $$P.R. = \frac{R + R_t}{R_o}$$

where:

$R$ = the value of variable resistor 62,
$R_t$ = the resistance value of anticipator 22, and
$R_o$ = the resistance value of the inner oven heater 18.

In operation, when the inner oven temperature is at a lower level than the set temperature established by the fixed operating point thermostat, the variable power anticipator and the outer oven temperature, the thermostat is open circuited, and transistor 58 is turned on by the positive voltage level applied to its base electrode via resistor 60. This action energizes heater 18 and the parallel connected variable power anticipator circuit. When the heat dissipated by heaters 18 and 22 causes the rising mercury column to close-circuit the thermostat, the negative terminal of source 56 is connected to the base of transistor 58, thereby causing the transistor and hence the heater energy source, to be turned off. The cycle then repeats itself when the inner oven temperature again falls below the set temperature. In this manner, the inner oven temperature is precisely controlled at the set level to which it has been adjusted by resistor 62.

Results of tests on the described system are presented in FIG. 5. The horizontal axis represents values of the power ratio, and the vertical axis represents values of measured internal oven temperature in degrees centigrade. The outer oven was thermostatically controlled at 40° C.±1° C. It wil be noted that very high values of P.R. (greater than 70) result in little heat being utilized to raise the thermostat temperature, and cyclic action becomes noticeable. However, for the this particular system, varying P.R. from approximately 5 to 70 results in a shift of oven temperature from 61° C. to 65.8° C., or a range of 4.8° C. Further refinement of design could easily broaden this spread, if necessary. At each set temperature within this range, (61° C. to 65.8° C.), inner oven temperature variations were less than the sensitivity of the measuring equipment, which was ±0.005° F.

In conclusion, a control system is provided for a dual oven system which employs fixed thermostats for both ovens, is capable of maintaining close tolerances of inner oven temperature, and yet has the capability of adjustment of inner oven temperature over a range of several degrees. If the slope of the P.R. curve is too negative (as indicated by $P.R. = 103$ of FIG. 1), or too positive, the inner oven temperature fluctuations ($dT$) will be too great, and adequate control will not be achieved. Subject to this limitation, the described oven system is capable of performance equal to or better than that of a similarly sized proportionally controlled oven, with the added advantages of economy, improved reliability and a lower control power requirement, due to the simplification of circuitry.

As a further advantage, the present invention allows flexibility in the location of the thermostat and variable anticipator which control the inner oven. For example, by properly calibrating the variable anticipator, the inner oven temperature can be controlled with mercury thermostat 20, anticipator 22 and variable resistor 62 mounted at some location external from the oven. In fact, the entire control circuit of FIG. 4, except for heater 18, may be placed at some remote location outside the oven, with only two interconnecting leads being required to pass through the inner oven walls for energizing heating element 18. With such an arrangement, the temperature measured by thermostat 20 is that of the ambient in which the thermostat is placed plus that resulting from the heat dissipation of the anticipator wound around the mercury bulb of the thermostat; hence, accurate remote control of the oven can be obtained by stabilizing the ambient temperature of the thermostat and properly calibrating the settings of variable resistor 62.

While a particular embodiment of the invention has been shown, it is to be understood that applicants do not wish to be limited thereto since many modifications can now be made by ones skilled in the art. For example, the variable power anticipator may be energized by a separate DC source rather than being connected in parallel with the oven heater; other means of varying anticipator power may be employed; and, various modes of remote control may be employed, including the location of only variable resistor 62 outside of the oven. Also, the invention may be applied to a single oven operating in an environment having little or no temperature fluctuation in place of the dual oven system described. The applicants, therefore, contemplate by the appended claims to cover all such modifications as fall within the true spirit and scope of their invention.

What is claimed is:

1. A temperature control system comprising, in combination, an inner oven having an electrical heating element thermally coupled thereto and mounted thereon, an outer oven enclosing said inner oven and having an electrical heating element thermally coupled thereto and mounted thereon, a first electrical control circuit connected to the heating element of said outer oven for maintaining the temperature of said oven within a given range, a second electrical control circuit connected to the heating element of said inner oven and including a thermostat responsive to the temperature of said inner oven for controlling power applied to the heating element of said inner oven so as to maintain the temperature of said inner oven at a preselected temperature, an electrical anticipator heating element for said thermostat, and a third control circuit connected to said anticipator heating element for enabling variation of power applied to said anticipator heating element so as to vary the amount of heat dissipated by said anticipator heating element with respect to the amount of heat dissipated by the heating element of said inner oven to thereby vary the inner oven-to-thermostat power ratio and adjust the preselected temperature of said inner oven.

2. A temperature control system in accordance with claim 1 wherein said third control circuit comprises a variable resistor connected in series with said anticipator heating element, and means connecting the series combination of said variable resistor and said anticipator heating element in parallel with the heating element of said inner oven.

References Cited

UNITED STATES PATENTS

| | | | |
|---|---|---|---|
| 2,932,714 | 4/1960 | Merrill | 219—501 |
| 3,158,821 | 11/1964 | Sulzer | 219—501 X |
| 3,231,719 | 1/1966 | De Viney et al. | |
| 3,240,916 | 3/1966 | Bray et al. | 219—501 |
| 3,243,609 | 3/1966 | Kompelien | 219—501 X |
| 3,299,300 | 1/1967 | Read et al. | 219—501 X |
| 2,973,420 | 2/1961 | Craiglow et al. | 310—8.9 X |
| 3,007,023 | 10/1961 | Johnson et al. | 310—8.9 X |

BERNARD A. GILHEANY, *Primary Examiner.*

H. B. GILSON, *Assistant Examiner.*

U.S. Cl. X.R.

310—8.9